(12) United States Patent
Roman Velazquez et al.

(10) Patent No.: US 10,569,253 B1
(45) Date of Patent: Feb. 25, 2020

(54) SYNTHESIS OF BIOCOMPOSITE ALGINATE-CHITOSAN-MAGNETITE NANOPARTICLE BEADS FOR REMOVAL OF ORGANIC PERSISTENT CONTAMINANTS FROM WATER SYSTEMS

(71) Applicants: Felix Roman Velazquez, Mayaguez, PR (US); Victor Fernandez Alos, San Juan, PR (US); Oscar Perales Perez, Mayaguez, PR (US)

(72) Inventors: Felix Roman Velazquez, Mayaguez, PR (US); Victor Fernandez Alos, San Juan, PR (US); Oscar Perales Perez, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 16/167,507

(22) Filed: Oct. 22, 2018

Related U.S. Application Data

(60) Provisional application No. 62/548,049, filed on Aug. 21, 2017.

(51) Int. Cl.
*B01J 20/30* (2006.01)
*B01J 20/02* (2006.01)
*B01J 20/24* (2006.01)
*B01J 20/28* (2006.01)
*C02F 1/28* (2006.01)
*C02F 101/34* (2006.01)

(52) U.S. Cl.
CPC ....... *B01J 20/3028* (2013.01); *B01J 20/0229* (2013.01); *B01J 20/24* (2013.01); *B01J 20/28009* (2013.01); *B01J 20/28016* (2013.01); *B01J 20/3071* (2013.01); *B01J 20/3078* (2013.01); *B01J 20/3085* (2013.01); *C02F 1/288* (2013.01); *C02F 1/281* (2013.01); *C02F 1/286* (2013.01); *C02F 2101/34* (2013.01); *C02F 2305/08* (2013.01)

(58) Field of Classification Search
CPC .... B01J 20/30; B01J 20/3028; B01J 20/0229; B01J 20/24; B01J 20/28009; B01J 20/3071; C02F 1/288
USPC .......................................................... 502/5
See application file for complete search history.

(56) References Cited

U.S. PATENT DOCUMENTS 9,101,910 B2 * 8/2015 Siwek .................... B01J 20/043

* cited by examiner

*Primary Examiner* — Edward M Johnson
(74) *Attorney, Agent, or Firm* — Hoglund & Pamias, PSC; Robert J. Rios

(57) ABSTRACT

The invention provides biocomposites alginate/chitosan beads integrated with magnetite nanoparticles and modified-surface magnetite derivate created and designed to remove from environmental waters and aquatic systems different types of organic persistent compounds such as benzophenone-3 (oxybenzone).

13 Claims, 10 Drawing Sheets

SYNTHESIS OF BIOCOMPOSITE ALGINATE-CHITOSAN-MAGNETITE NANOPARTICLE BEADS FOR REMOVAL OF ORGANIC PERSISTENT CONTAMINANTS FROM WATER SYSTEMS

BACKGROUND OF THE INVENTION

Organic ultraviolet (UV) filters have been widely incorporated on sunscreens as the main ingredient to absorb UV-rays from solar radiation. Among organic UV filters, benzophenone-3 (BP3, oxybenzone) has been extensively applied on sunscreens as well as into thousands of products ranging from pharmaceutical, pesticides, plastics stabilizer, paints, textiles and personal-care products such as cosmetics, shampoos, fragrances, and detergents which are consumed daily worldwide. Sunscreens are used in increasing amounts; due to growing concerns in reduce skin maladies (e.g. sunburns and skin cancer) by absorbing UV radiations ranging between UVB (315-280 nm) and UVA (400-315 nm). The extensive consumption of sunscreens around the world is mostly associated to coastal tourism activities (e.g. beachgoers).

A series of studies reported that BP3 enters environmental waters, after sunscreens were scrubbed-out from beachgoers skin are defined as a direct input of BP3 onto recreational water systems was observed at coastal waters, rivers, swimming pools and lakes. Furthermore, the relationship between higher BP3 concentrations on coastal waters as a function of number of beachgoers on various tropical beaches has been correlated. It has also been reported that the levels of BP3 range between (75 ug/L-1.4 mg/L) and (0.8 ug/L-19.2 ug/L) in seawater sampled throughout U.S. Virgin Islands and Hawaii's islands, respectively.

BP3 contamination in aquatic systems was promulgated as an emerging contaminant of growing concerns for their endocrine disrupting properties on marine organisms. Prior art reported the first studies on the effects of BP3 concentration on bleached corals under in-vitro experimental parameters showing BP3 concentrations ranging from 2.3 ug/L to 2 mg/L on coral bleached. Several in vitro studies further supports that even trace amounts of BP3 has been linked to coral bleaching. Among others assays closely agreement was observed to weaken immune systems of corals as well as disrupting symbiotic properties. Furthermore, insight in-vitro studies reveal adverse effects of BP3 endocrine disrupting functions on certain fish species. The use of BP3 active ingredients in sunscreens will increase at unprecedented levels in the coming decades. It has been estimated that 16,000 tons of BP3 are expected to be discharged from coastal tourism throughout the Caribbean by the year 2020. Therefore, special attention should be given when considering the reduction of BP3 directly discharged into coastal waters for the remediation of coral reefs and marine habitats along touristic hotspots beaches within the Caribbean islands.

Currently, conventional wastewater techniques for the removal of BP3 have been broadly applied on diverse treatment procedures. Although the efficiency of coagulation-flocculation removal procedures for BP3 were reported on less than 10%, studies have shown that these are inadequate procedures for the removal of BP3. A wastewater treatment plant with continuous a microfiltration process only achieves removal (>5%) of BP3. However, many studies were carried out on wastewater treatment plants with advanced oxidation processes (AOP), like ozonation, where efficiencies removal of BP3 were reported ranging from 20, 28, and 43%. In addition to ozonation, other studies of advanced oxidation processes, such as ultrasonic irradiation were used to remove 67% of BP3 from aqueous solutions. The operational costs as well as maintenance complexes procedures including the by-product residues are limited to few wastewater treatment plants. A previous report showed that ~84% was removed by adsorption of BP3 onto powder activated granular carbon adsorbent from aqueous solutions. Despite numerous conventional and advanced methods being available to remove BP3 in wastewater treatment plants, these procedures cannot be directly integrated onto coastal waters polluted by marine tourism activities. Currently, in-situ remediation techniques for BP3 removal from coastal waters, by means of adsorption procedures, have not been reported on the literature.

SUMMARY OF THE INVENTION

The present invention provides the synthesis of a biodegradable adsorbent bead integrating chitosan/alginate with magnetite nanoparticles ($Fe_3O_4$) designed as a remediation technique for marine habitats (e.g. coral reefs).

According to one aspect of the invention, batch controlled experimental parameters were performed and controlled on adsorption of BP3 from aqueous solutions onto magnetite-chitosan/alginate beads ($Fe_3O_4$-CABs).

According to another aspect of the invention, approximately 172 mg/g maximum adsorbed amounts of BP3 occurred at solution pH of 8, after 10-hour equilibrium, based on Langmuir model isotherms.

According to still another aspect of the invention, analysis of Freundlich model and the mean relative percent modulus were evaluated to determine the BP-3 sorption behavior onto $Fe_3O_4$-CABs followed by adsorption paths processes.

BRIEF DESCRIPTION OF THE DRAWINGS

Further features and advantages of the invention will become apparent from the following detailed description taken in conjunction with the accompanying figures showing illustrative embodiments of the invention, in which.

DETAILED DESCRIPTION OF THE INVENTION

Materials and Methods

Chemicals, Reagents and Equipment

The reagents were acquired with ACS-grade analytical purity, $FeCl_3 \cdot 6H_2O$ (>98%, ACROS Organics™), $FeCl_2 \cdot 4H_2O$ (>97%, ACROS Organics™) and potassium hydroxide (85%), as-received by Fischer Chemical. Sodium oleate (>98%), and chitosan medium molecular weight contained degree of deacetylation (75-85%) were acquired from Sigma-Aldrich Co. The alginic acid sodium salt was procured by MP Biomedicals, LLC, whereas calcium chloride dihydrate (99%, ACS purity) and glacial acetic acid (99%, ACS-grade) were purchased from Fisher Chemical. The selected emerging contaminant benzophenone-3 (BP3) was provided as a fine grain powder, as-received from Sigma-Aldrich Co., (98%, Alfa Aesar). Some organic solvents such as acetone HPLC-grade (99% purity certified ACS) and ethanol (95%) were procured from Fischer Chemical. All dilution for standard concentrations and individual sorption solutions were made by using deionized water of 18.2 MΩ·cm at DOC<0.3 mg/L (Millipore Corp, USA).

Synthesis of Biodegradable Adsorbent Beads

The method of synthesizing the biodegradable adsorbent beads according to an embodiment of the present invention will be discussed in conjunction with FIGS. 1-4.

Figure 1:
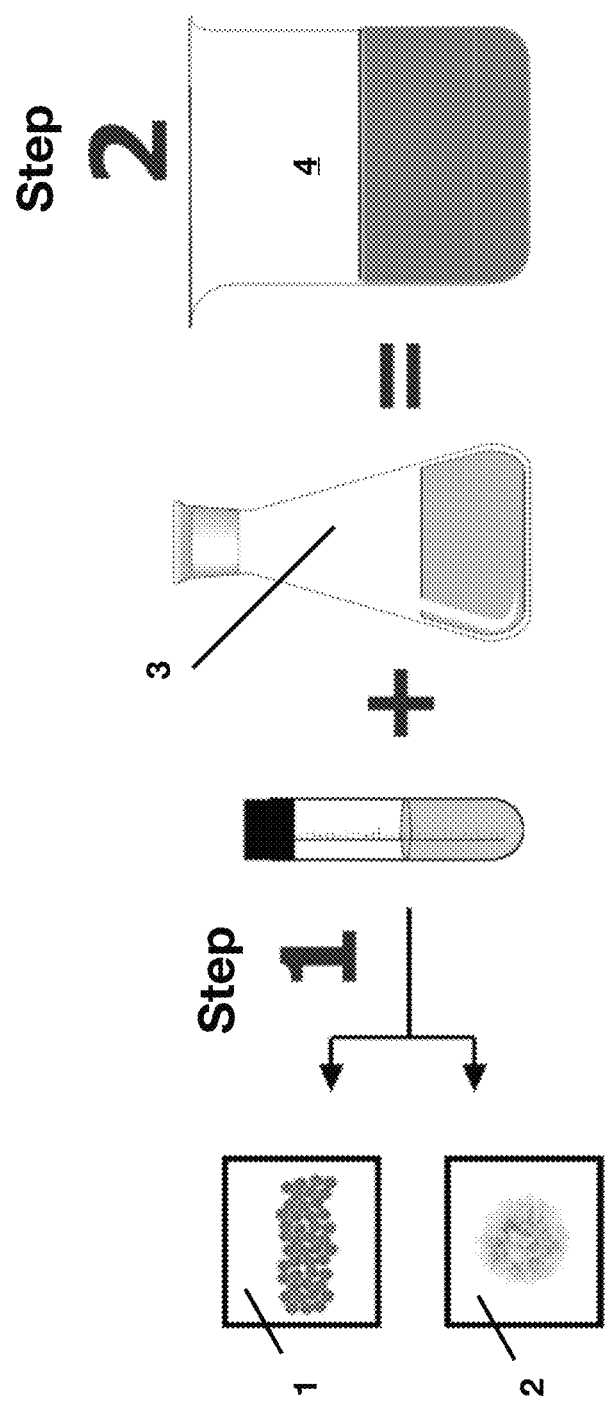
FIG. 1 shows a schematic diagram for the synthesis of chitosan/alginate magnetic beads according to the present invention.

As illustrated in FIG. 1, magnetite nanoparticles, chitosan, and sodium-alginate were used to prepare the beads of the present invention. Specifically, a combination of magnetite nanoparticles and surface-modified magnetite derivate 1 were first blended with sodium-alginate 2 in their solid-state phases (Step 1). This mixture was then added to a solution of 2% (w/v) chitosan 3 and mechanical overhead stirred at 330 rpm for 50 minutes. Accordingly, Na-Alginate (×gr)+ Magnetite nanoparticles (×gr)+Chitosan (×gr) were mixed and diluted on 5% Acetic Acid (Total Dilution Volume=60 mL), wherein the solution of 5% Acetic Acid were made from 5 mL Glacial Acid [concentrated acid] diluted by 95 mL DI-H2O. A resultant homogeneous solution 4 of magnetite nanoparticles, alginate, and chitosan is formed (Step 2) as shown in FIG. 1. The solution is maintained in constant agitation at 330 rpm by a mechanical overhead stirrer 5 while being heated to 35° C. by a hotplate 6 and monitored by a thermometer 7.

Figure 2:
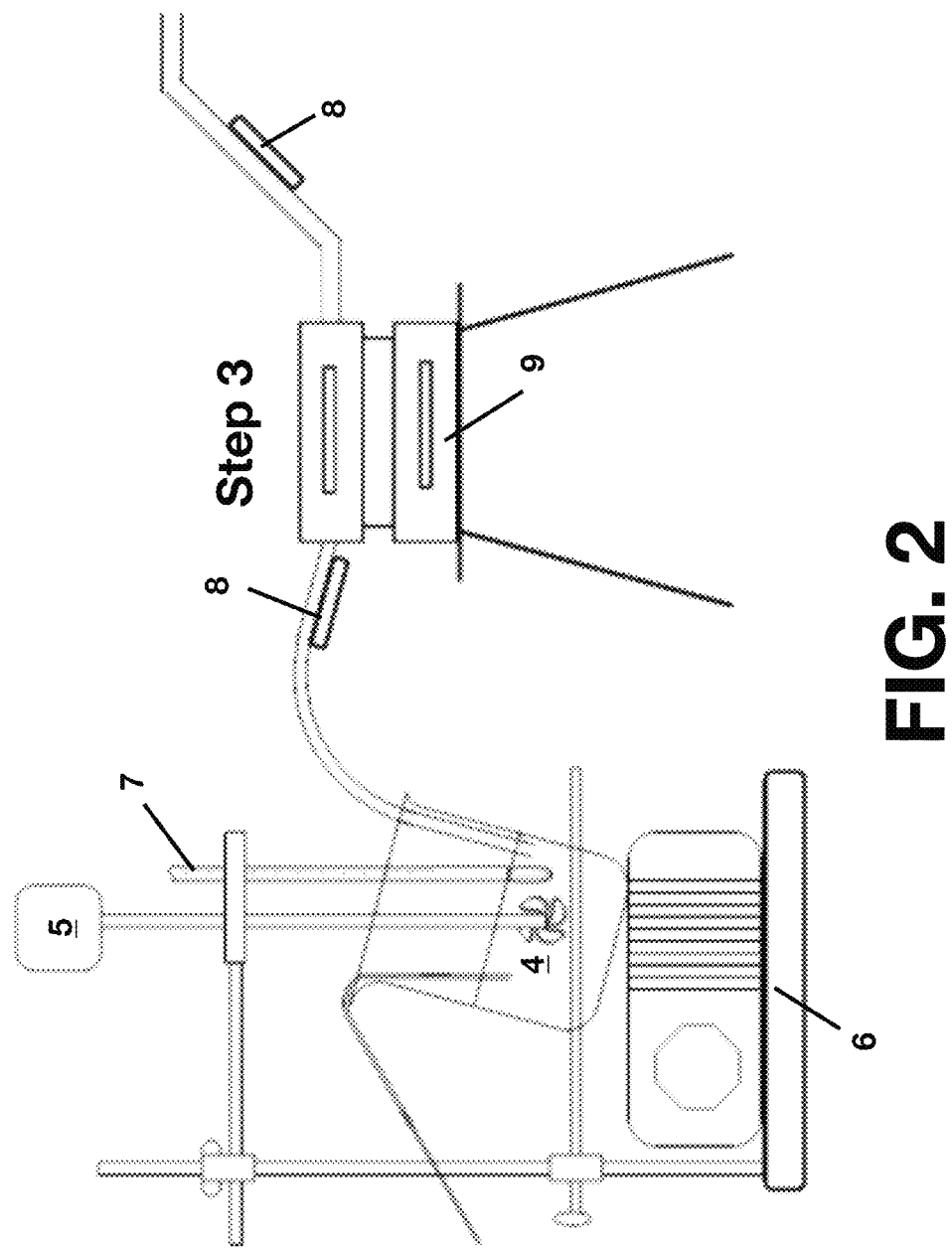
FIG. 2 shows a schematic diagram for continuation of the synthesis of chitosan/alginate magnetic beads shown in FIG. 1, according to the present invention.

Once the solution reaches 35° C., it is transferred to a basic solution using a peristaltic pump (Step 3) as shown in FIG. 2. Heat pads 8 are used to heat or maintain the solution at a temperature while it is transferred. Specifically, heat pads 8 are provided at the input and output of the peristaltic pump 9 to maintain warm temperatures closed to 35° C. The mean temperature of the heat pads 8 of 35° C. was provided by the manufacturer. No temperature measurements were taken after the solution was pumped transferred dropwise to a basic solution. The solution is pumped dropwise at a constant flow rate of 7 ml per minute.

Figure 3:
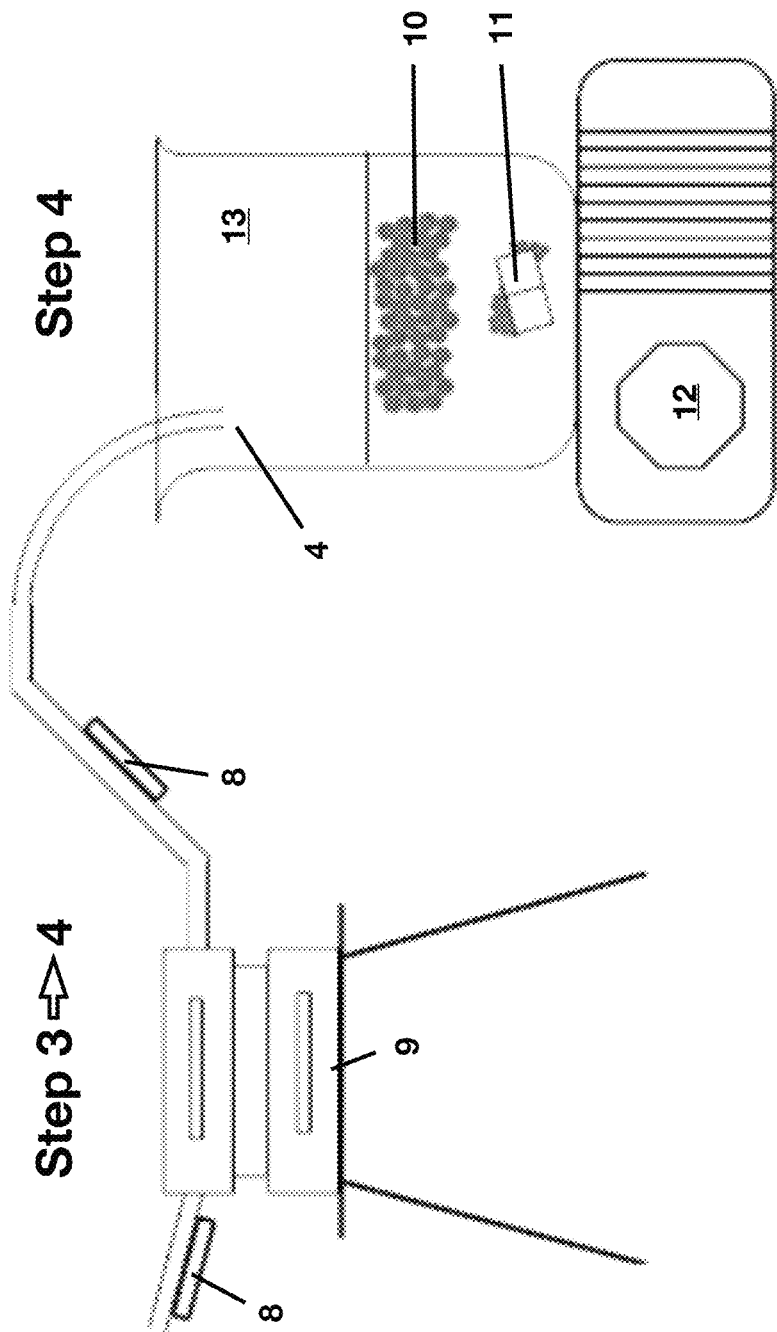
FIG. 3 shows a schematic diagram for continuation of the synthesis of chitosan/alginate magnetic beads shown in FIG. 2, according to the present invention.

As shown in FIG. 3, the aqueous solution of magnetite, alginate and chitosan 4 was transferred dropwise to a closed container 14 enclosing a 400 mL solution of 0.5 M of potassium hydroxide (KOH) diluted with deionization (DI) water (Step 4) creating the bio-composites solid beads of the present invention. Variations in concentrations between 0.05 to 0.5, and 1 Mole/L of KOH were prepared in 400 mL DI-water. Specifically, the concentrations are selected to optimize the process. In a preferred embodiment according to the present invention, a concentration of 0.5 Mole/L (M) KOH was used.

Once the composite solution is completed transferred to the potassium hydroxide solution the spherical beads were stirred at 60 rpm for 24 hours by a magnetic stirrer 12, as shown in FIG. 3. A magnetic bar 11 is provided to maintain the solution (magnetite+alginate+chitosan) moving during transfer. Once a volume portion of this solution contacts the KOH solution a solid phase is formed creating the beads. The magnetic bar creates a "whirlpool" effect that reduces aggregation of the transferred phase preventing the volume transferred from becoming aggregated at a single location.

Figure 4A:
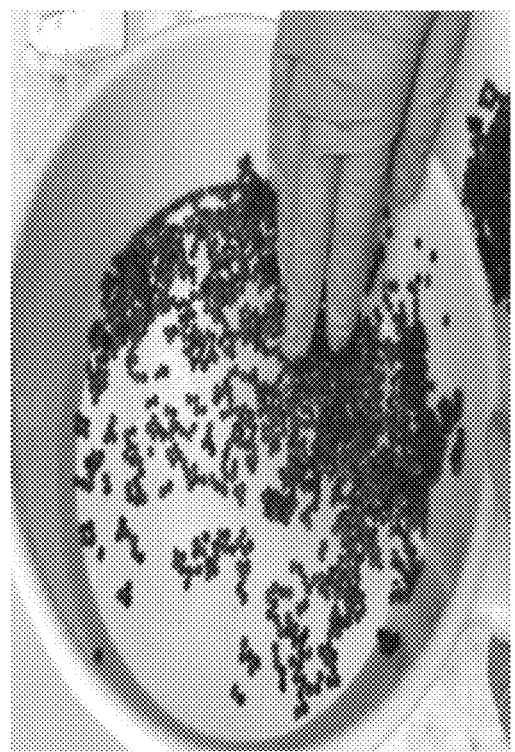
FIG. 4A shows a schematic diagram for continuation of the synthesis of chitosan/alginate magnetic beads shown in FIG. 3, according to the present invention.
Figure 4B:
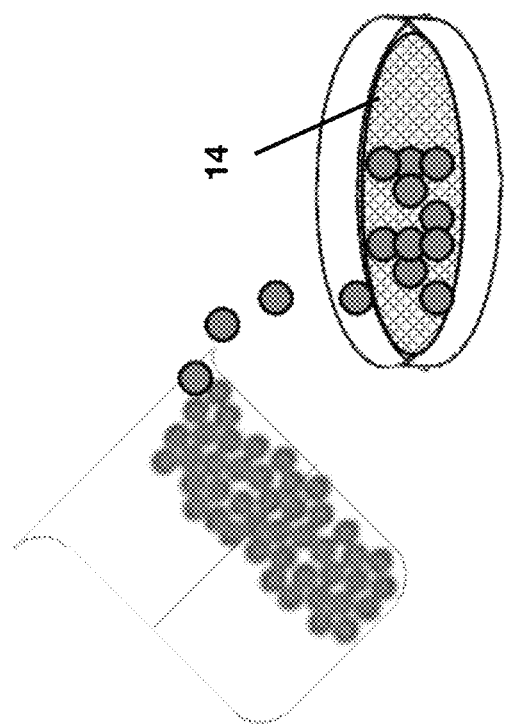
FIG. 4B shows a photo of the final prepared beads according to the present invention.

Finally, the resulting synthesized sphere-shape beads were removed from the KOH solution after 24 hours and washed using a sieve 14 during several cycles to rinse out the synthesized beads as shown in FIG. 4A. FIG. 4B is a photo showing the final prepared beads according to the present invention.

Characterization of Biodegradable Adsorbent Beads

Infrared Spectroscopy

An attenuated transmittance-reflectance Fourier Transform Infrared Perkin Elmer Spectrum Two (ATR-FTIR) was used to collect and identify functional groups on the surface covering the magnetic nanoparticle. The accumulation-scanning amount of 100 was subjected to a 4 $cm^{-1}$ resolution. An ATR mode parameter for the spectra wavenumber ranging between 4000 $cm^{-1}$ and 550 $cm^{-1}$ was applied on all sample studies.

Figure 5:
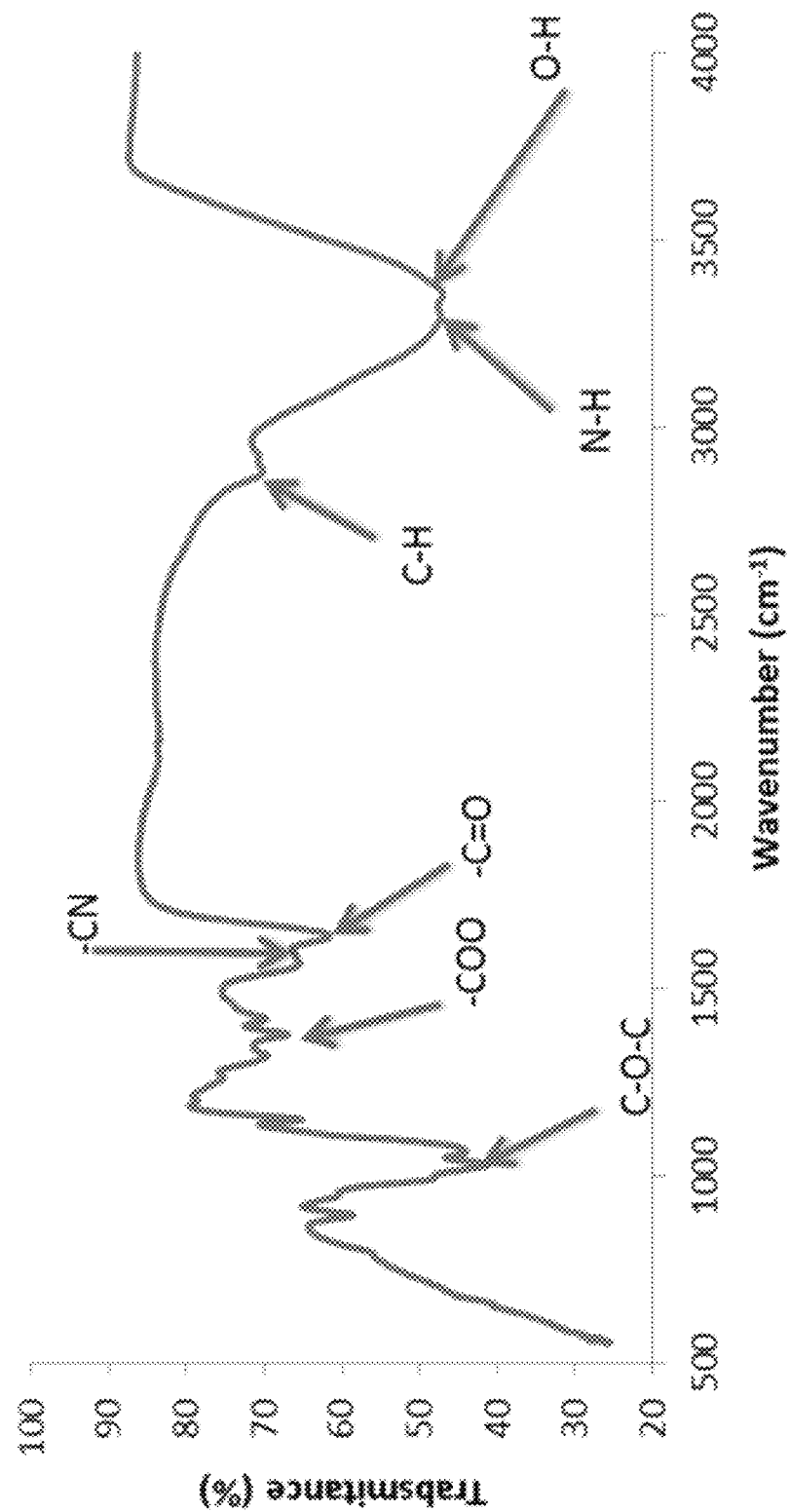
FIG. 5 shows ATR-FTIR spectrum of magnetic $Fe_3O_4$-CABs wherein significant functional groups are identified and wavenumber located by arrow.

The spectrum seen on FIG. 5 shows evidence of the magnetic nanocomposite composed of $Fe_3O_4$ and chitosan and alginate biopolymers beads (CAB). The functional groups present in the alginate and chitosan matrix are clearly visible in the spectrum shown in FIG. 5. The presence of the carbon oxygen double bonds and the carboxylic acid functional groups are characteristic of the alginate biopolymer. The presence of the N—H and C—N bands are characteristic of the chitosan biopolymer. The above spectrum represents a mixture of both alginate and chitosan biopolymers.

Raman Spectroscopy

Raman spectra were observed from a Horiba Raman microscope Olympus, BX41, equipped with a laser source at wavelengths of 514 nm and 633 nm. The resolution of the spectrum was adjusted to 4 cm−1 and the power of the laser was adjusted to 15 mW for each of the specimens tested with an acquisition time of approximately 360 second.

Particle Size Distribution

The average particle size and its distribution was determined by a Zeta Potential/Particle Sizer NICOMPTM 380 ZLS, (Santa Barbara, Calif., USA). The parameters for the acquisition of data were optimized to 646 nm laser, counting mode every 50 seconds for 3 minutes, with 90 degrees between the incident beam and the diffracted diffraction angle.

Point of Zero Charge

The point of zero charge ($pH_{pzc}$) was used to relate the pH and the net charge of the magnetic particle in aqueous medium. Enclosing volume of 100 mL solution concentrations of 0.01 M NaCl were prepared on amber screw-cap bottles for each solutions-pH, wherein a consistent adsorbent dosage of 0.05 grams of $Fe_3O_4$-CABs was added.

This adsorbent material was introduced, after the initial solution-pH ($pH_0$) range was adjusted from 4, 6, 8, and 10 pH-scale. These specific acid-base aqueous solution-pH where acquired by adding certain amount of 0.01M NaOH and 0.01M HCl. Specifically, the amount depends on the inital desired pH of the solution. For example, for pH 4, ~1500 uL of 0.01 M HCL was added and for pH 6, ~700 uL was added. For solutions with basic pH (pH 8), ~1300 uL of 0.01M NaOH was added and ~2700 uL de 0.01M NaOH was added to reach a pH 10.

Each sample solutions were kept in mechanical agitation at 250 rpm at average mean room temperatures of 27° C. After 48 hours the final solutions-pH ($pH_F$) per sample are measured. The difference between ($pH_0-pH_F$) and $pH_0$ was plotted to determine the $pH_{pzc}$. The pH value where neutrality at adsorbent surface is most probable was observed on the intersection between the plotted curve and the x-axis. This experiment was prepared and tested in triplicate for each sample of solutions-pH.

Figure 6:
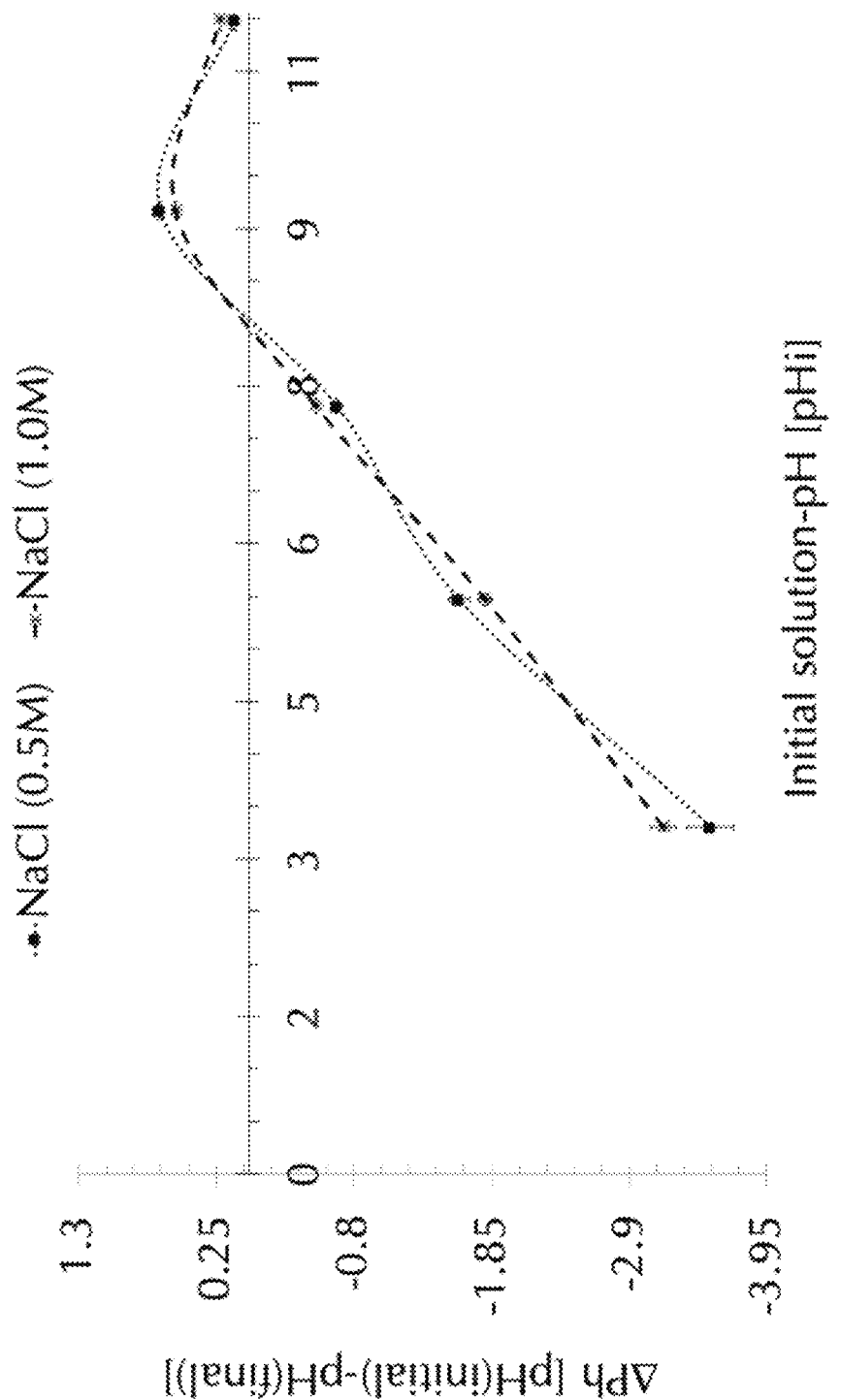
FIG. 6 shows the points of zero charge ~8.3 pH for absorbent magnetic $Fe_3O_4$-CABs in different ionic strengths solutions ranging between 0.5 and 1.0 M NaCl for 24 hour contacted time.

The Point of Zero Charge ($PH_{pzc}$) is the pH in which the surface of the material becomes neutral. $PH_{pzc}$ is related to an equilibrium balance charges between positive and negative charge on the surface and above this point the surface becomes negative and below it becomes positive. It's a very important parameter to understand surface absorption. FIG. 6 shows the determinations of the $PH_{pzc}$ for different ionic strength solutions. The amount of 3 gr of magnetic $Fe_3O_4$-CABs was used on each solution-pH which ranged from 3, 5, 7, 9, and 11 pH.

pH Dependence Experiments and % BP3 Removal

Figure 7:
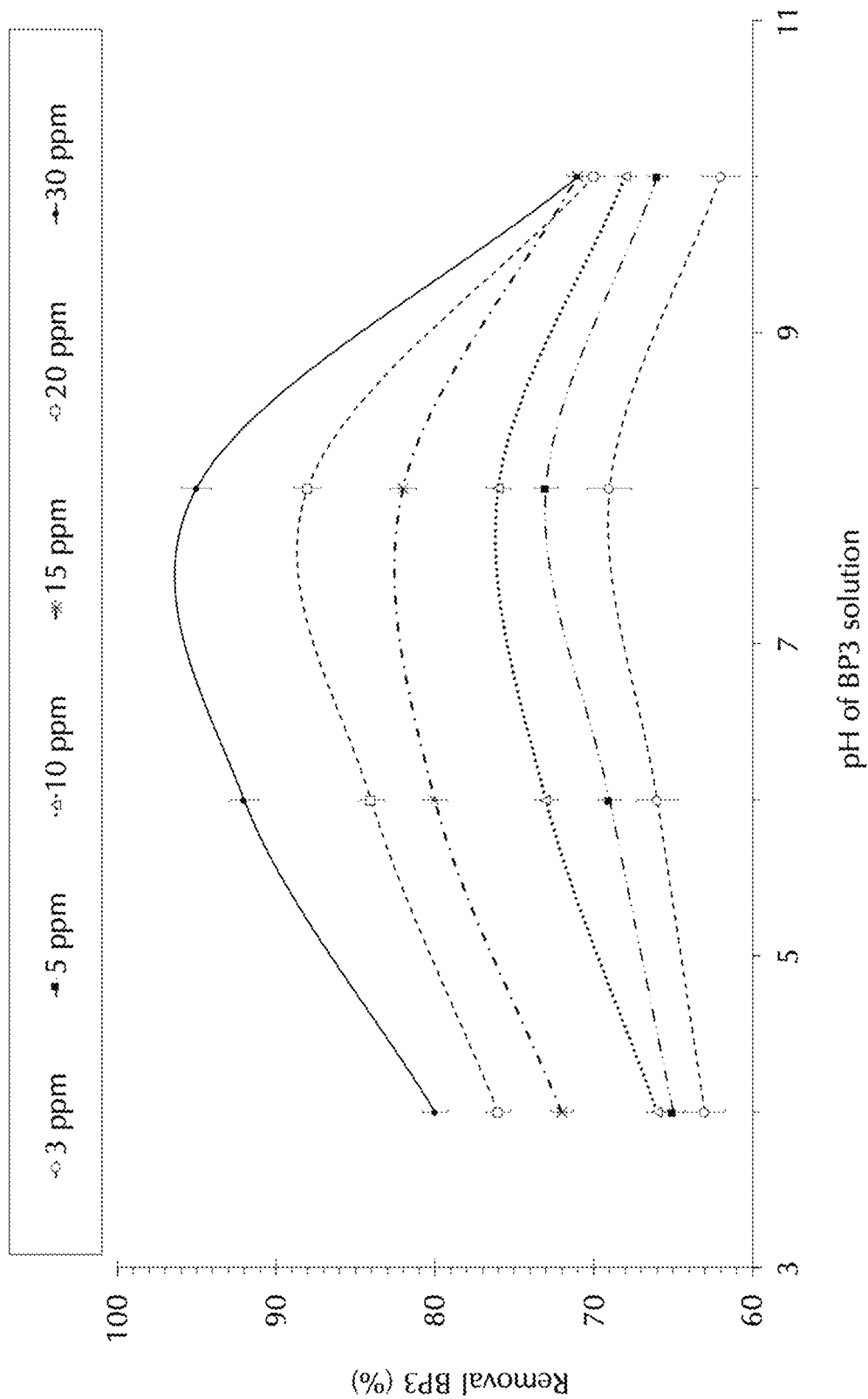
FIG. 7 shows the effect of solution-pH on absorptive removal percentage onto magnetic $Fe_3O_4$-CABs, according to the present invention.

FIG. 7 shows the effect of solution-pH on absorptive removal percentage onto magnetic $Fe_3O_4$-CABs from solution volume 100 mL at different BP3 initial concentrations as depicted on the top legend. For each concentration of BP3 that was tested, various pH solutions were adjusted ranging from 4, 6, 8 and 10 pH, and triplicate samples were prepared per initial concentrations of BP3 that was used for statistical assays. As can be appreciated from FIG. 7, the maximum % BP3 removal was observed between pH 6 and 9, which is compatible with real scenarios found for natural or most wastewaters. These results evidence the applicability of the developed magnetic composite for real applications.

Adsorption Experiments

The experimental data of the isotherms was evaluated to determine the adsorption of acetone from aqueous solutions onto synthesized $Fe_3O_4$-CABs. A series of batch experiments were performed on different selected experimental parameters such as initial concentration of acetone (3, 5, 10, 15, 20, 30 mg/L), adjusted initial solution-pH (4, 6, 8, 10), and initial adsorbent amounts (0.05, 0.10, 0.15 g). Fixed experimental parameters were used on temperature at 25° C. and solutions volume of 100 mL were hold on an amber screw tap vessel of 125 mL. Preparation of concentration samples for adsorption experiments required a stock solution of 500 mg/L acetone. The standard concentration for the solutions was selected within a range between 3, 5, 10, 15, 20, 30 mg/L and were made from stock aliquot transfer volumes.

Figure 8:
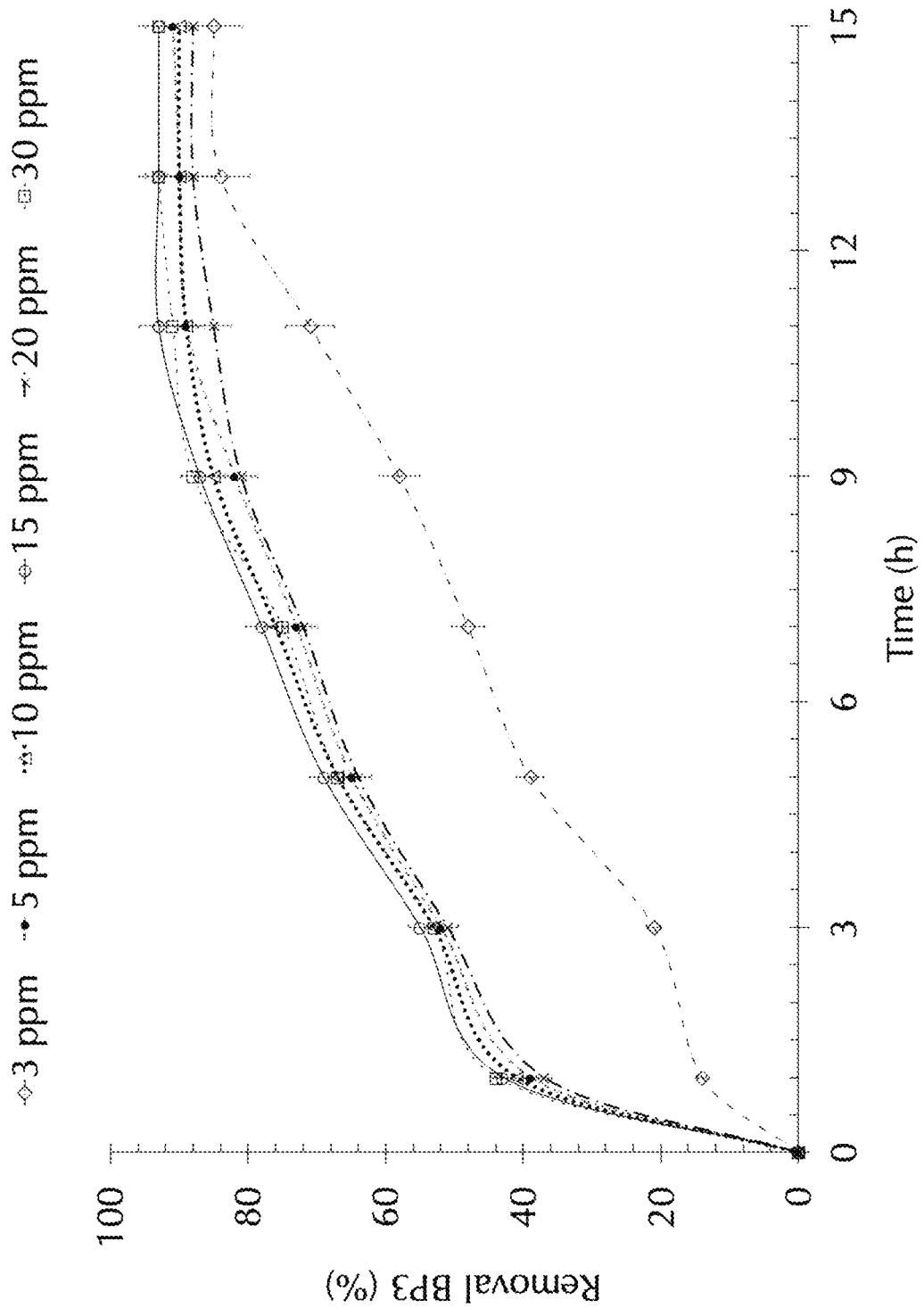
FIG. 8 shows the effects of initial concentration on the removal percentages of BP3 when using 0.15 g/100 of magnetic $Fe_3O_4$-CABs as absorbent.

FIG. 8 shows absorption experiments of 3, 5, 10, 15, 20 and 30 ppm of BP3 when 0.15 g/100 ml of the magnetic $Fe_3O_4$-CABs absorbent was used at pH 8.03. The results show that equilibrium was reach after approximately 15 hours at 250 rpm shaker. Also FIG. 8 shows a similar absorption trend for all BP3 concentrations except for 3 ppm. The maximum % BP3 removal varies between 80 and 90% at equilibrium. Each sorption tests were carried-out under similar batch experimental parameters, solution-pH ~8.03±0.01 as well as absorbent dosage of 0.15 g in a volume of 100 mL under controlled temperature of 26° C. The initial concentrations of BP3 ranging from 3 to 30 ppm are depicted on the top legend of the Figure at pH 8.0.

Absorption Isotherms: the Freundlich and Langmuir Models

Figure 9:
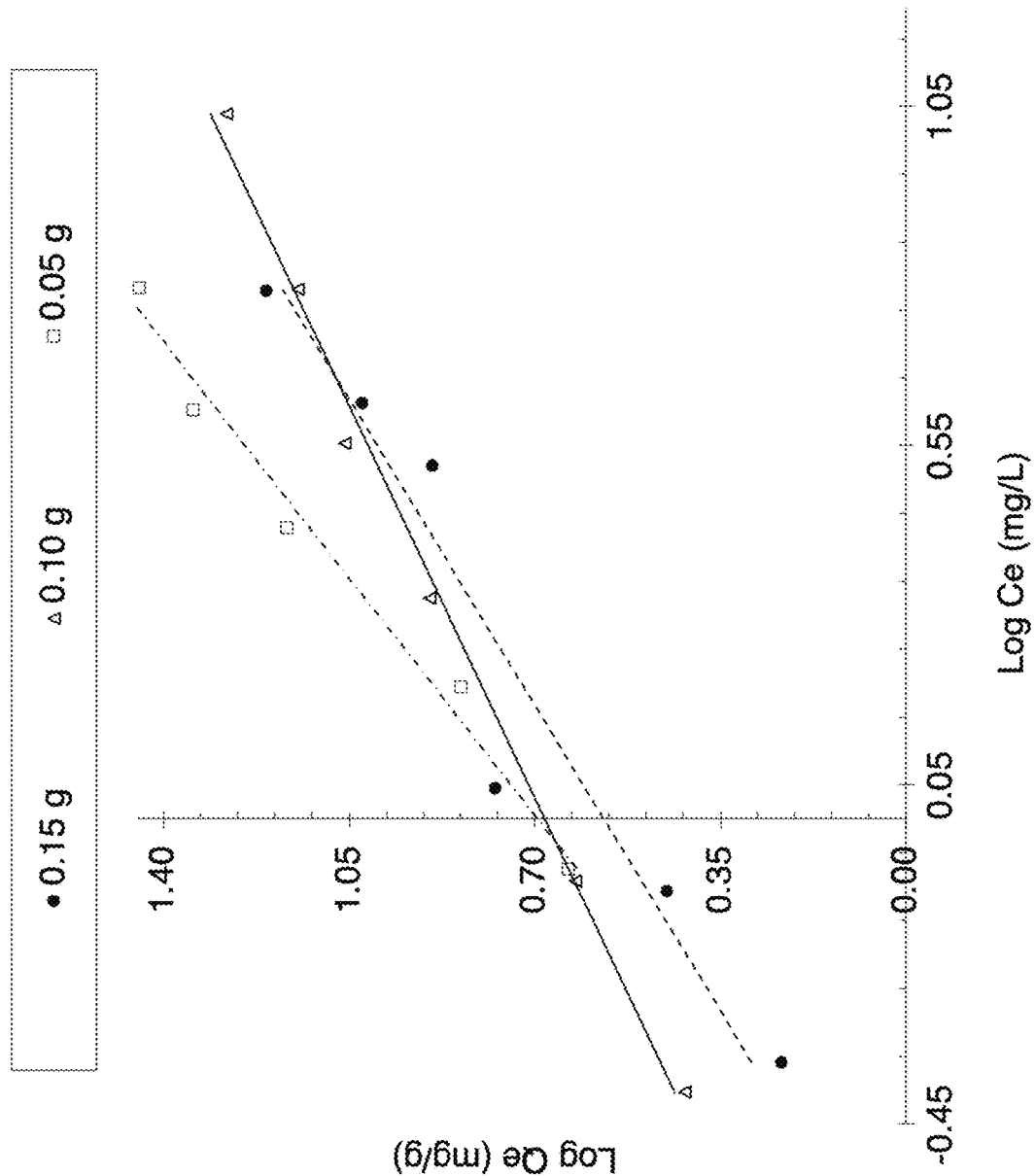
FIG. 9 shows Freundlich isotherms for different adsorbent weight ranging 0.15, 0.10, and 0.05 g effects adsorbed amount of BP3 under experimental parameters and solution-pH 8 with an Equilibrium time of 15 hours.

Table 1 below and FIG. 9 show the results for the Freundlich isotherms models and Table 2 below summarizes the results for the Langmuir isotherm model. The $R^2$ results in Table 1 shows values of 0.94, 0.99 and 0.98 at pH 6 and 8 for absorbent loads of 150 g, 0.100 and 0.050 g respectively; for pH 6 these $R^2$ values are 0.96, 0.98 and 0.98. The $R^2$ values for the Langmuir model presented in Table 2 show more consistent values at the same pH 6 and 8, which ranged between 0.98 and 0.99, which indicate that this model fits better the results for absorption process. The data from these tables indicate that the Langmuir isotherm model fits better the results obtained in this absorption experiments.

TABLE 1

Freundlich isotherms parameters evaluated on different adsorbent dosages

| Absorbent | Solution-pH | | | |
|---|---|---|---|---|
| | 4 | 6 | 8 | 10 |
| 0.150 g | | | | |
| n | 1.05 | 1.98 | 1.30 | 0.90 |
| $K_f$ | 0.81 | 1.73 | 3.81 | 0.76 |
| $R^2$ | 0.99 | 0.96 | 0.94 | 0.99 |
| 0.100 g | | | | |
| n | 1.08 | 1.30 | 1.65 | 0.95 |
| $K_f$ | 0.44 | 2.17 | 4.80 | 0.60 |
| $R^2$ | 0.99 | 0.98 | 0.99 | 0.99 |
| 0.050 g | | | | |
| n | 1.81 | 1.14 | 1.23 | 1.50 |
| $K_f$ | 1.77 | 1.43 | 4.94 | 1.22 |
| $R^2$ | 0.93 | 0.98 | 0.98 | 0.90 |

TABLE 2

Langmuir isotherms parameters evaluated on different adsorbent dosages.

| Adsorbent | Solution-pH | | | |
|---|---|---|---|---|
| | 4 | 6 | 8 | 10 |
| 0.150 g | | | | |
| $Q_m$ (mg/g) | 52.91 | 64.10 | 68.03 | 37.88 |
| $K_L$ (L/mg) | 0.011 | 0.076 | 0.147 | 0.018 |
| $R^2$ | 0.99 | 0.98 | 0.98 | 0.99 |
| 0.100 g | | | | |
| $Q_m$ (mg/g) | 42.04 | 76.34 | 158.73 | 48.31 |
| $K_L$ (L/mg) | 0.004 | 0.079 | 0.053 | 0.016 |
| $R^2$ | 0.99 | 0.99 | 0.99 | 0.97 |
| 0.050 g | | | | |
| $Q_m$ (mg/g) | 83.33 | 109.89 | 204.08 | 44.64 |
| $K_L$ (L/mg) | 0.01 | 0.053 | 0.026 | 0.014 |
| $R^2$ | 0.99 | 0.99 | 0.98 | 0.98 |

Figure 10:
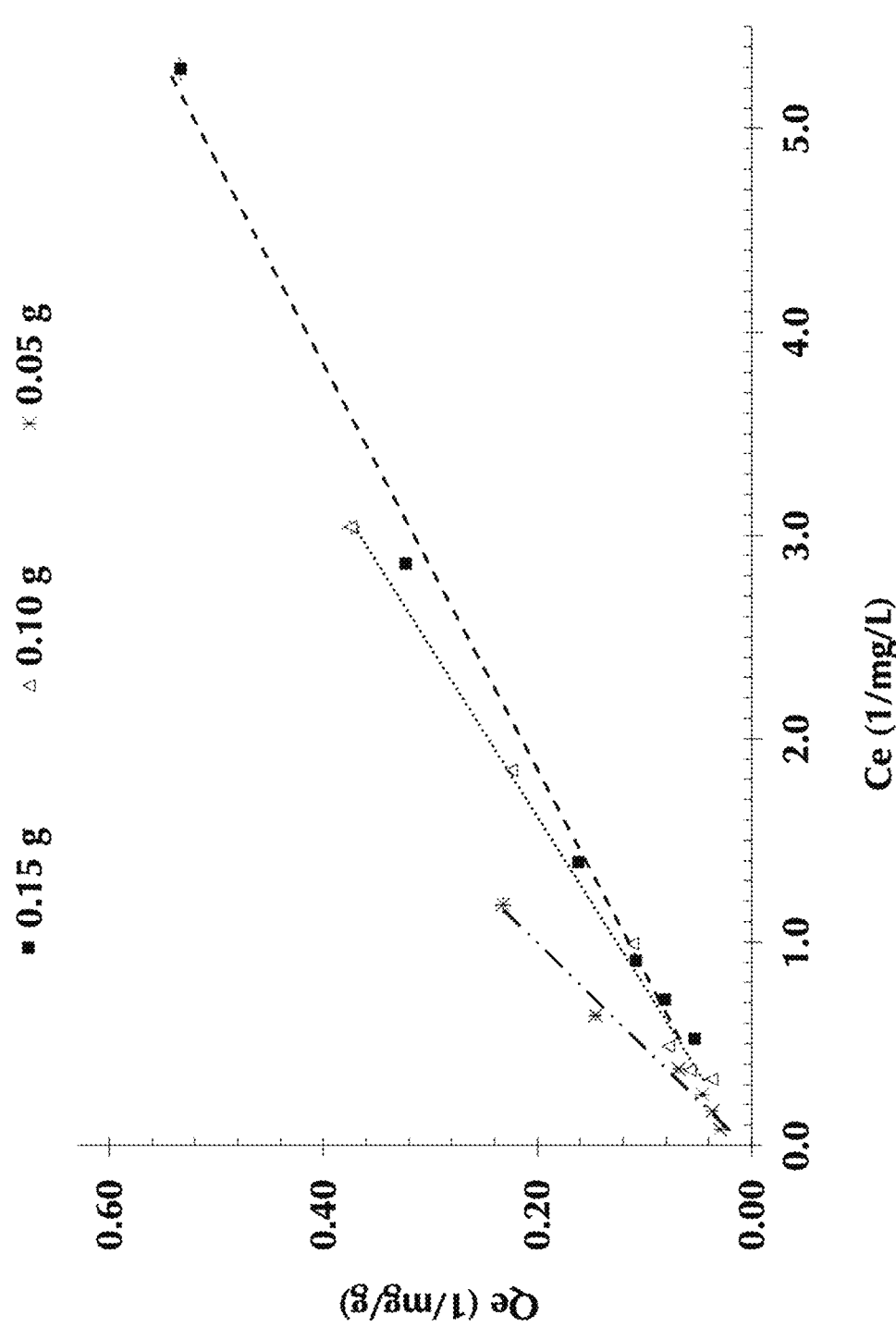
FIG. 10 shows a Langmuir plot of BP3 adsorption onto $Fe_3O_4$-CABs with different adsorbent dosage ranges from 0.15 g (square), 0.10 g (triangle) and 0.05 g (cross) with experimental; solution-pH of 8 and equilibrium time of 15 hours.

From the Langmuir and Freundlich models the absorption capacity of the absorbent can be calculated. The Freundlich constant (Kf) and Langmuir maximum absorbed capacity (Qm) a good estimate of the absorption capacity of the absorbed can be calculated. In our case the Langmuir models fits better the absorption data. From the Freundlich model the highest value of Kf of 4.94 (mg BP3 per g absorbent) was achieved for pH 8 and a 0.050 g of absorbent load. From the Langmuir model $Q_m$, which represents the maximum amount absorbed (Table 2) shows that the highest Qm (204.08 mg/g was also for pH 8 and 0.050 g of absorbent (FIG. 10). The high $K_f$ and $Q_m$ values suggest for the magnetic nanocomposite absorbent composed of $Fe_2O_3$alginate-chitosan beads has a good affinity for BP3 and has a great potential to be used in the cleaning of organic pollutants present in water such as BP3 among others.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the invention.

The invention claimed is:

1. A method of synthesizing a biodegradable adsorbent bead comprising:
blending magnetite nanoparticles with sodium alginate in their solid-state phases to form a mixture;
adding said mixture to a solution of chitosan and mechanically stir the mixture;
diluting the stirred mixture to form a homogeneous solution;
mechanically stirring the homogeneous solution while heating said homogeneous solution until a predefined temperature is reached;
transferring said heated homogeneous solution to a basic solution to form solid beads;
magnetically stirring said solid beads, and
removing said solid beads from the basic solution to obtain a composite biodegradable adsorbent bead.

2. The method of synthesizing a biodegradable adsorbent bead according to claim 1, wherein said mixture and said solution of chitosan are mechanically stirred at 330 rpm for 50 minutes.

3. The method of synthesizing a biodegradable adsorbent bead according to claim 1, wherein said stirred mixture is diluted on Acetic Acid.

4. The method of synthesizing a biodegradable adsorbent bead according to claim 3, wherein said Acetic Acid is made from glacial acid diluted by deionization water.

5. The method of synthesizing a biodegradable adsorbent bead according to claim 1, wherein the homogeneous solution is stirred at 330 rpm while heated at 35° C.

6. The method of synthesizing a biodegradable adsorbent bead according to claim 1, wherein said heated homogeneous solution is transferred to said basic solution dropwise.

7. The method of synthesizing a biodegradable adsorbent bead according to claim 1, wherein said heated homogeneous solution is maintained at said predefined temperature while being transferred to said basic solution.

8. The method of synthesizing a biodegradable adsorbent bead according to claim 6, wherein said heated homogeneous solution is transferred at a constant flow rate.

9. The method of synthesizing a biodegradable adsorbent bead according to claim 1, wherein said heated homogeneous solution is transferred to a closed container enclosing said basic solution.

10. The method of synthesizing a biodegradable adsorbent bead according to claim 1, wherein said basic solution comprises potassium hydroxide.

11. The method of synthesizing a biodegradable adsorbent bead according to claim 1, wherein said solid beads are magnetically stirred at 60 rpm for 24 hours.

12. The method of synthesizing a biodegradable adsorbent bead according to claim 1, wherein a magnetic bar is provided inside said closed container to maintain the solution moving during transfer avoiding particle aggregation.

13. The method of synthesizing a biodegradable adsorbent bead according to claim 1, wherein said solid beads are removed from the basic solution after 24 hours and washed using a sieve.

* * * * *